(12) United States Patent
Pereira Morais et al.

(10) Patent No.: US 11,994,022 B2
(45) Date of Patent: May 28, 2024

(54) ELECTRONIC SYSTEM FOR RECOVERING THE COMMUNICATION SIGNAL OF THE BOTTOM SENSOR AND TESTER OF THE COMMUNICATION MODULE/MMI WITH THE BOTTOM SENSOR IN OIL WELLS OPERATING WITH SCP

(71) Applicants: Petróleo Brasileiro S.A.—Petrobras, Rio de Janeiro (BR); UNIVERSIDADE FEDERAL DA BAHIA—UFBA, Salvador (BR)

(72) Inventors: Carlos Stenio Pereira Morais, Mossoró (BR); Marcos Pellegrini Ribeiro, Petrópolis (BR); Antonio Cezar de Castro Lima, Salvador (BR); Leizer Schnitman, Salvador (BR); Marcio Fontana, Salvador (BR); Raimundo Jorge Abreu de Jesus, Salvador (BR); Ricardo André Oliveira dos Reis, Salvador (BR); Tiago de Oliveira Silva, Salvador (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 17/900,989

(22) Filed: Sep. 1, 2022

(65) Prior Publication Data

US 2023/0212942 A1    Jul. 6, 2023

(51) Int. Cl.
*E21B 47/12*    (2012.01)
*H02M 3/335*    (2006.01)

(52) U.S. Cl.
CPC ............. *E21B 47/12* (2013.01); *H02M 3/335* (2013.01)

(58) Field of Classification Search
CPC ............................... E21B 47/12; H02M 3/335
See application file for complete search history.

(56) References Cited

U.S. PATENT DOCUMENTS

| 9,605,535 B2* | 3/2017 | Logan ....................... E21B 7/04 |
| 2014/0228074 A1* | 8/2014 | Kulkarni ......... H04M 1/724092 |
| | | 455/557 |
| 2016/0251956 A1* | 9/2016 | Parra ....................... E21B 47/13 |
| | | 340/854.9 |
| 2018/0051700 A1 | 2/2018 | Sheth et al. |

FOREIGN PATENT DOCUMENTS

CN    102966334 A    3/2013

OTHER PUBLICATIONS

Fonseca, Diego Antonio D. (2018) "Implementation of a Data Transmission System through the Power Line of the Wells with the Submerged Centrifugal Pump Elevation Method".

* cited by examiner

*Primary Examiner* — Franklin D Balseca
(74) *Attorney, Agent, or Firm* — Mintz, Levin, Cohn, Ferris, Glovsky and Popeo, P.C.

(57) ABSTRACT

An electronic system is capable of assuming the role of master module before the proprietary module of the manufacturer of the SCP system, in the absence of a response to the first request from the supervisory system, or when the proposed module detects that the original module is inappropriately carrying out the PCM signal decoding. The system is further capable of monitoring new variables available at the bottomhole, regardless of the limited set of variables provided by the original module of the SCP system.

10 Claims, 9 Drawing Sheets

ELECTRONIC SYSTEM FOR RECOVERING THE COMMUNICATION SIGNAL OF THE BOTTOM SENSOR AND TESTER OF THE COMMUNICATION MODULE/MMI WITH THE BOTTOM SENSOR IN OIL WELLS OPERATING WITH SCP

CROSS-REFERENCE TO RELATED APPLICATION

This application claims priority to Brazilian Application No. 10 2021 017360 2 filed on Sep. 1, 2021, and entitled "ELECTRONIC SYSTEM FOR RECOVERING THE COMMUNICATION SIGNAL OF THE BOTTOM SENSOR AND TESTER OF THE COMMUNICATION MODULE/MMI WITH THE BOTTOM SENSOR IN OIL WELLS OPERATING WITH SCP," the disclosure of which is incorporated herein by reference in its entirety.

FIELD OF THE INVENTION

The present invention is based on the development of a system to deal with communication problems between the equipment present on the surface and the sensors present at the bottom of an oil production well.

DESCRIPTION OF THE STATE OF THE ART

The loss of communication between the bottomhole sensor and the surface supervisory equipment is still a recurring problem in submerged centrifugal pumping (SCP) systems and involves potential loss of production. In general, the communication between the surface panel and the instrumentation installed at the base of the electric motor of the SCP system (bottomhole) takes place through a specific protocol and a pulse code modulation (PCM) of direct voltage that uses the three-phase power cable (flat cable) of the SCP system with physical medium for the traffic of information from the sensors. Direct voltage is also used to power the sensor module installed at the bottomhole. This direct voltage, when it reaches the surface, is decoupled from the alternating voltage of the well surface through inductors in series with the phases (chokes). At the bottomhole, the decoupling of voltages is promoted by the windings of the electric motor. Breaks and/or deterioration of the dielectric insulation of the flat cable of the SCP can lead to the leakage of current between one of the phases and the ground loop of the three-phase system, which can cause severe attenuations of the communication signal, leading to loss of communication.

Since the communication signal between the bottom sensor and the surface travels through the three-phase power cable, the communication loss can occur when there is leakage current, usually due to the deterioration of the electric cable insulation. In this scenario, the system usually remains powered up and running; however, it loses communication with the bottom sensor.

The problem evidenced in wells equipped with SCP is that the cable loses insulation, with current leakage occurring between the conductor and the metallic mass of the cable, or between conductors. For small leakage currents, commercial systems are able to acquire the bottom sensor data without any problems or difficulties, but as the current becomes high, the signal degenerates to the point where the bottom sensor loses communication with the surface system. At this point, the plant's operational manager loses technical information, which can harm the oil production of the well and the safety of the installed equipment.

Because they are proprietary technologies, it is not possible to state details about the robustness offered by commercial equipment. Problems associated with this equipment can come from several sources, from the ability to supply current to communication protocols that are not sufficiently fault tolerant; or, further, restrictions on signal processing and filtering processes that, in one way or another, can lead to loss of communication from commercial equipment.

Wells equipped with SCP present a proprietary data acquisition system integrated with commercial SCP systems. This acquisition system aims at obtaining the values of variables measured by the bottom sensors installed in this pumping system. In general, in commercial SCP systems it can be considered that its composition is formed by a bottom sensor, an inductive filter panel (choke), a voltage source, protocol converter, an auxiliary source, and the inverter panel with a man-machine interface, in addition to the pump, seal/protector and motor. In this way, the data from the bottom sensor are sent to the surface panel through the power cable that powers the motor, requiring a filter to separate the signal.

Figure 1:
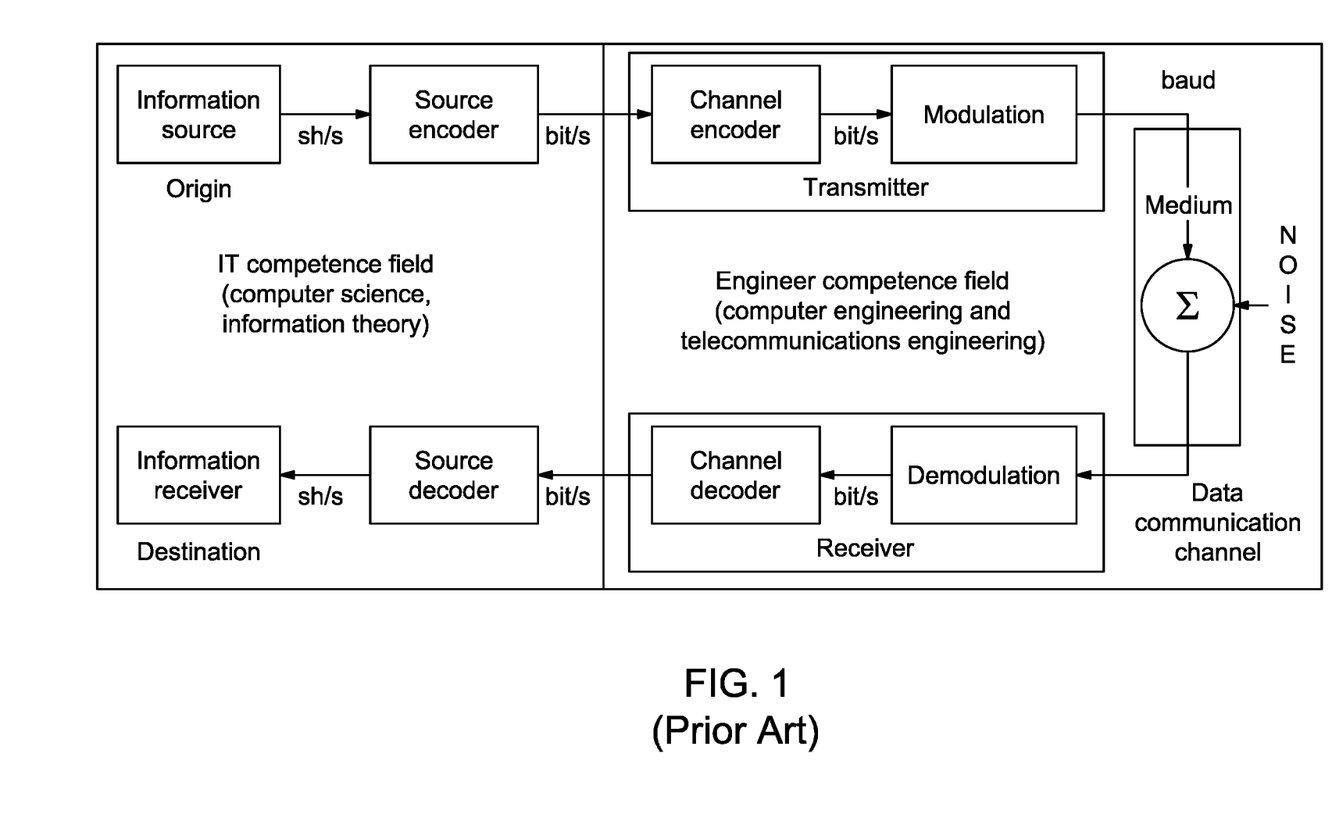
FIG. 1, which illustrates the main functional blocks that make up an information communication system based on Shannon's model for data communication.

Shannon's (1948) model for data communication, illustrated in FIG. 1, is still taken as a reference for both the development and analysis of modern data communication systems (ROCHOL, 2012).

The communication system model proposed by Shannon (1948) is based on a point-to-point information communication system. The upper blocks indicate the processing of information from the source to the modulator, while the lower blocks indicate the processing of signals from the receiver to the destination. Other functional blocks may exist in practical systems and, depending on the type of application and technology, some blocks are optional and their sequences of operations can be exchanged (PIMENTEL, 2007; ROCHOL, 2012).

The information sampling process constitutes a primordial step in the generation of PCM (Pulse Code Modulation) signals, which is the basis for understanding digital hierarchies. Sampling theory was established by Harry Nyquist (1933), who demonstrated that an analog signal can be reconstituted as long as samples are taken at regularly spaced times. This is due to the fact that an analog signal incorporates a large amount of redundancy and, therefore, it is unnecessary to transmit the same continuously. Nyquist proved that the minimum sampling frequency is equal to twice the maximum frequency of the signal to be transmitted. Nyquist's theory shows that the number of samples per unit time of a signal, called the sampling rate or frequency, must be greater than twice the highest frequency contained in the signal to be sampled, so that the signal can be fully reproduced. Half of the sampling frequency is called the Nyquist frequency and corresponds to the maximum frequency limit of the signal that can be reproduced. As it is not possible to guarantee that the signal will not contain signals above this limit (distortions, interference, noise, etc.), it is necessary to filter the signal with a low-pass filter with a cut-off frequency equal to (or lower than) the Nyquist frequency, or filter anti-aliasing, so that the signal can be recovered (HAYKIN, 2008).

In digital systems, the signal recovery elements are called regenerators. These elements or devices generate a new digital signal from the received signal (distorted and/or attenuated and/or contaminated with noise, among other possible interferences in the original signal).

Document US20180051700A1 discloses a system and method for monitoring parameters using microelectromechanical sensors at multiple points of the submerged centrifugal pumping (SCP) system. The microelectromechanical sensors are coupled to microcircuits configured to perform the processing of signals received by the sensors. Said sensors can be coupled so that the data is sent to the surface equipment by an electrical line or by a transmission channel. Equipment such as transmitters, signal processors, displays and input and output devices are suggested for data transmission.

Document CN102966334A discloses a submerged centrifugal pumping system suggesting an interface for reading bottom sensor data, consisting of a submerged centrifugal pumping system, which comprises a pump, a high-pressure interface, a protection unit, an underground detection unit, and a reception and display unit. An underground sensor of the underground detection unit is arranged on the lower part of the electric submersible pump. The data from the underground detection unit is transmitted to the surface receiving and displaying unit through the high-pressure interface, and to the protection unit through a three-phase power cable of the electric submersible pump. The receiving and displaying unit is used to decode the original received data and display.

The non-patent document—"FONSECA, Diego Antonio de Moura (2018)—Implementation of a data transmission system through the power line of the wells with the submerged centrifugal pump elevation method" discloses a data transfer system developed for sending information from the variables measured at the bottomhole to the surface, providing operators and specialists with an overview of the pump and motor behavior. Data transfer takes place serially, by DC current signal, with the three-phase cable seen as a single conductor and ground as the return path. A communication protocol was developed, guaranteeing the interaction between the modules.

The presented priorities do not disclose the ability to deal with communication problems between surface equipment with bottom sensors in SCP when there is a considerable leakage current. The object of the present invention is an electronic system (hardware/firmware) basically consisting of an operating mode in the bottom sensor communication signal regenerator function, with the objective of increasing the ability to maintain communication between the surface supervisory equipment with the bottom sensor of the SCP system, impaired by the leakage current, and an operating mode in the emulator function of the bottom sensor, in order to test the surface supervisory equipment of the SCP system.

The invention essentially consists of three electronic boards: power supply, responsible for powering the bottom sensor, signal acquisition, with the function of acquiring the signal from the bottom sensor, and signal processing, responsible for interpreting the signal from the acquisition board and provide the user with the values sent by the bottom sensor. Thus, the documents mentioned in the State of the Art do not have the unique features of this invention, which will be presented in detail below.

OBJECTIVE OF THE INVENTION

The present invention aims at providing an electronic system (hardware/firmware) to address to communication problems between surface equipment with bottom sensors in SCP, increasing the current ability to retrieve information from bottom sensors, in the event of faults caused by leakage currents.

BRIEF DESCRIPTION OF THE INVENTION

The present invention proposes a system capable of assuming the role of master module before the proprietary module of the manufacturer of the SCP system, in the absence of a response to the first request from the supervisory system, or when the proposed module detects that the original module is performing inappropriately the decoding of the PCM signal. The proposed module will further allow the monitoring of new variables available at the bottomhole, regardless of the limited set of variables provided by the original module of the SCP system.

The invention aims at covering a technical gap hitherto unsolved (signal loss between the bottom sensors and the surface panels), adding a set of possibilities that can be used to increase the performance of the well production and the increase in the average time between failures (MTBF—Medium Time Between Failures), with the development of specific know-how for SCP systems.

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

There follows below a detailed description of a preferred embodiment of the present invention, by way of example and in no way limiting. Nevertheless, it will become clear to one skilled in the art, from reading this description, possible further embodiments of the present invention still comprised by the essential and optional features below.

The present invention addresses to an electronic system (hardware/firmware) consisting of two modes of operation: (a) operating mode in the function of regenerator of the communication signal of the bottom sensor to increase the ability to maintain communication between the surface supervisory equipment with the SCP system bottom sensor and (b) operating mode in the bottom sensor emulator function to test the SCP system surface supervisory equipment.

It is worth to emphasize that the emulator function of the bottom sensor electronics does not correct or diagnose the problems of surface supervisory equipment. This function generates pre-defined information on the variables of a bottom sensor, and it is up to the operator to identify whether the information configured in the electronic system is correctly visualized in the man-machine interfaces of the manufacturers' commercial systems and, with that, to assess the condition of the supervisory equipment of surface.

The electronic system of the invention behaves as an intelligent voltage source, which offers a stabilized output voltage between 60 and 90 VDC, with a maximum output current around 67 mA to power the bottom sensor and provide the extra current for possible leakage currents in the power cable.

This system can be fully applied in four operating conditions of a SCP system, which are:
 a) Preventive application in signal regenerator function: A commercial SCP system is installed in a well and operating without any restrictions regarding the bottomhole sensor communication signal with SCP. In this scenario, the electronic module in the signal regenerator function is preventively installed in the well to guarantee and maintain the bottomhole sensor operating even in high leakage current conditions. This preventive application is justified in wells that indicate symptoms of degradation of the electric cable insulation, even allowing for monitoring and following the evolution of this deterioration.
 b) Corrective application in signal regenerator function: A commercial SCP system is installed in a well and operating without communication with the bottomhole sensor. In this scenario, the electronic system in the function of signal regenerator is installed in the well, post-diagnosis of the problem (corrective action) to eliminate the problem of loss of communication of the bottomhole sensor, even operating permanently in high leakage current conditions. The electronics module guarantees a higher current supply capacity (up to 3.5 times more) when compared to a commercial SCP system.
 c) Application of the bottom sensor emulator to test the surface supervisory equipment of the commercial SCP system: In this scenario, the surface supervisory equipment is only tested directly in the field. The electronics in the bottom sensor emulator function also allows testing the surface supervisory equipment of the SCP system in the workshop/laboratory.
 d) Application in monitoring downhole variables in inactive wells. For continuous monitoring, the variables obtained by the equipment can be made available to any surface systems that have the capacity to store historical data. For planned monitoring, with a single piece of equipment, the user can visit several wells over the course of a day, just to collect the information and then make it available to those requesting the information.

The electronic system of the invention essentially consists of three electronic boards: one for power supply, one for signal acquisition, and one for signal processing.

Figure 2:
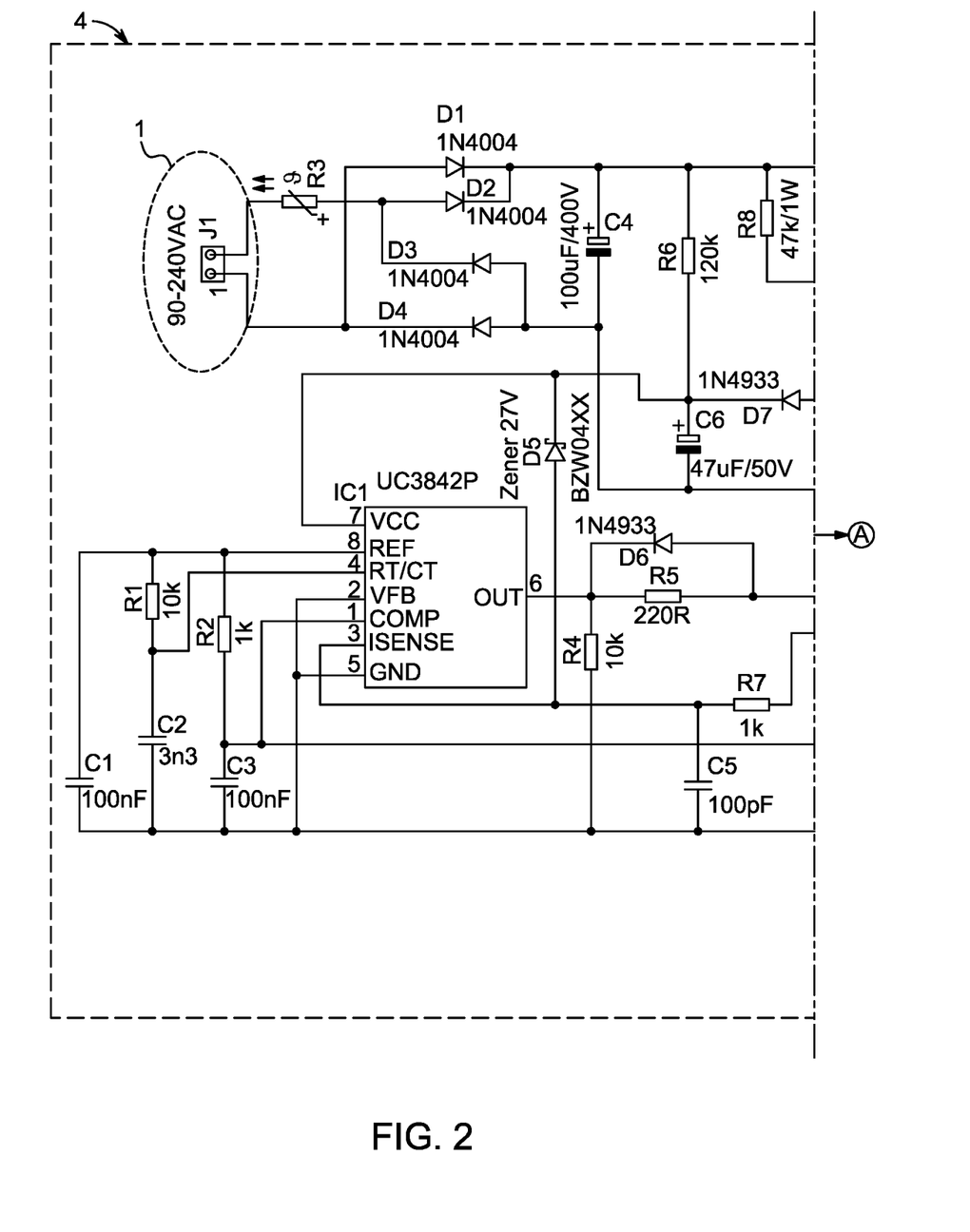
FIG. 2, which illustrates the power board diagram, where there are represented: 90 to 240 VAC Source (1), Differential Source±10 V (2), Source+10 V (3)

The power board, as shown in FIG. 2, is responsible for powering the bottom sensor, at a voltage of 60 to 90 VDC, with a maximum current of approximately 67 mA. It also supplies power to the internal circuits, with voltages of ±10 VDC. This board's main component is a flyback, step-up (60 to 90 V) and step-down (±10 V) switching power supply.

Figure 3:
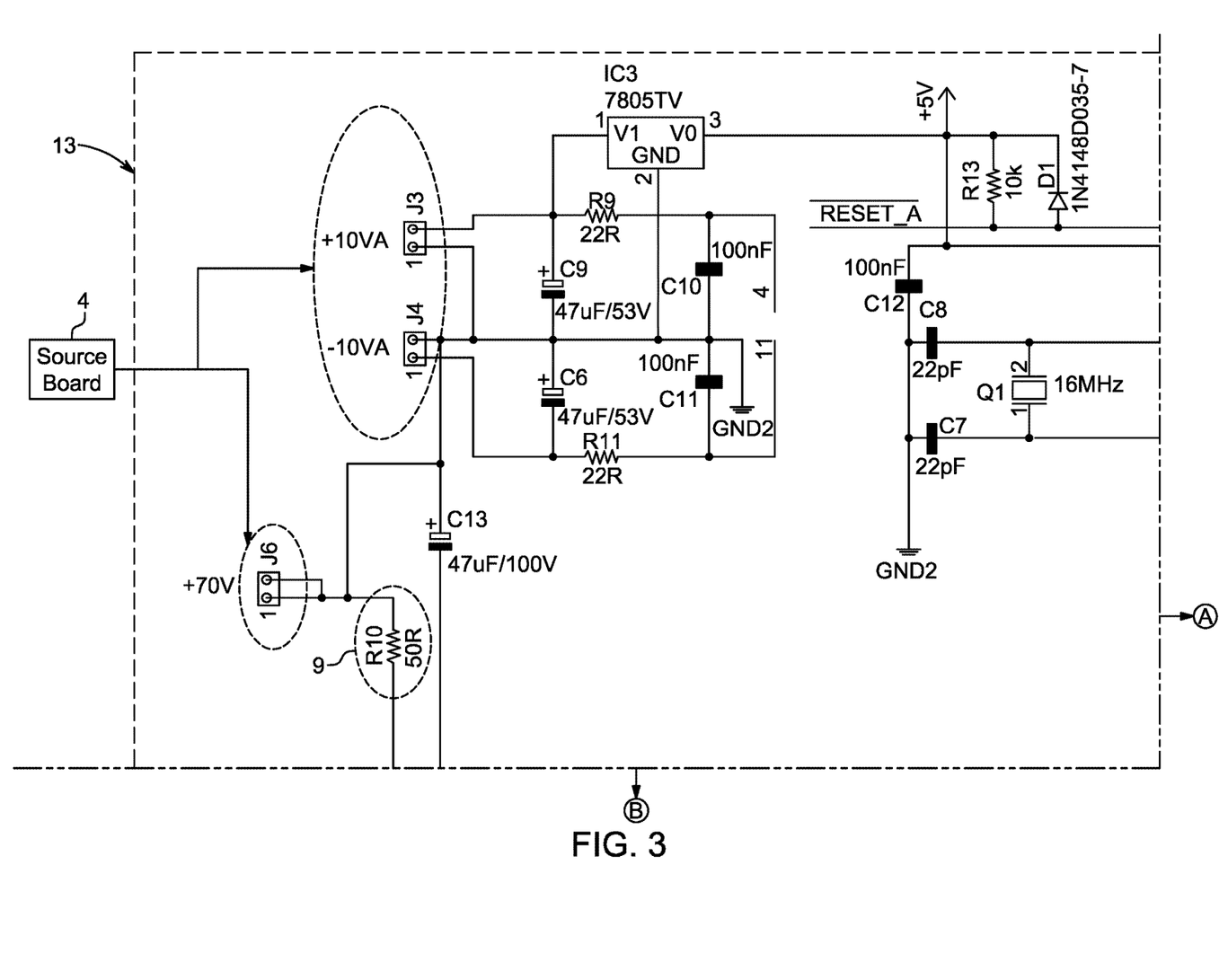
FIG. 3, which illustrates the schematic of the acquisition board, where there are represented: Power from the source board (4), Microcontroller (5), Communication with the processing board (6), Relay (7), Connection with sensor (8), Resistor R10 (9), Analog Filter (10), Offset Control (11), Gain Control (12).

The signal acquisition board, as shown in FIG. 3, has the function of acquiring the signal from the bottom sensor. The acquisition takes place by inserting a resistor (9) between the source and the sensor. The voltage variation in the resistor (9) is treated through an active filter (10) and amplifiers with gain adjustment (12), and delivered to the ADC (Analog To Digital Converter) of the microcontroller (5). This microcontroller (5) is dedicated to the tasks of acquisition, control of signal conditioning, digital filtering, and on-off control of the voltage supply to the bottom sensor. The main components of the acquisition board are: microcontroller (U4 (5)), active analog filter (IC1D (10)), gain control circuit (IC1C (12)), offset (IC1B (11)), relay (K1 (7)), and resistor (R10 (9)).

Figure 4:
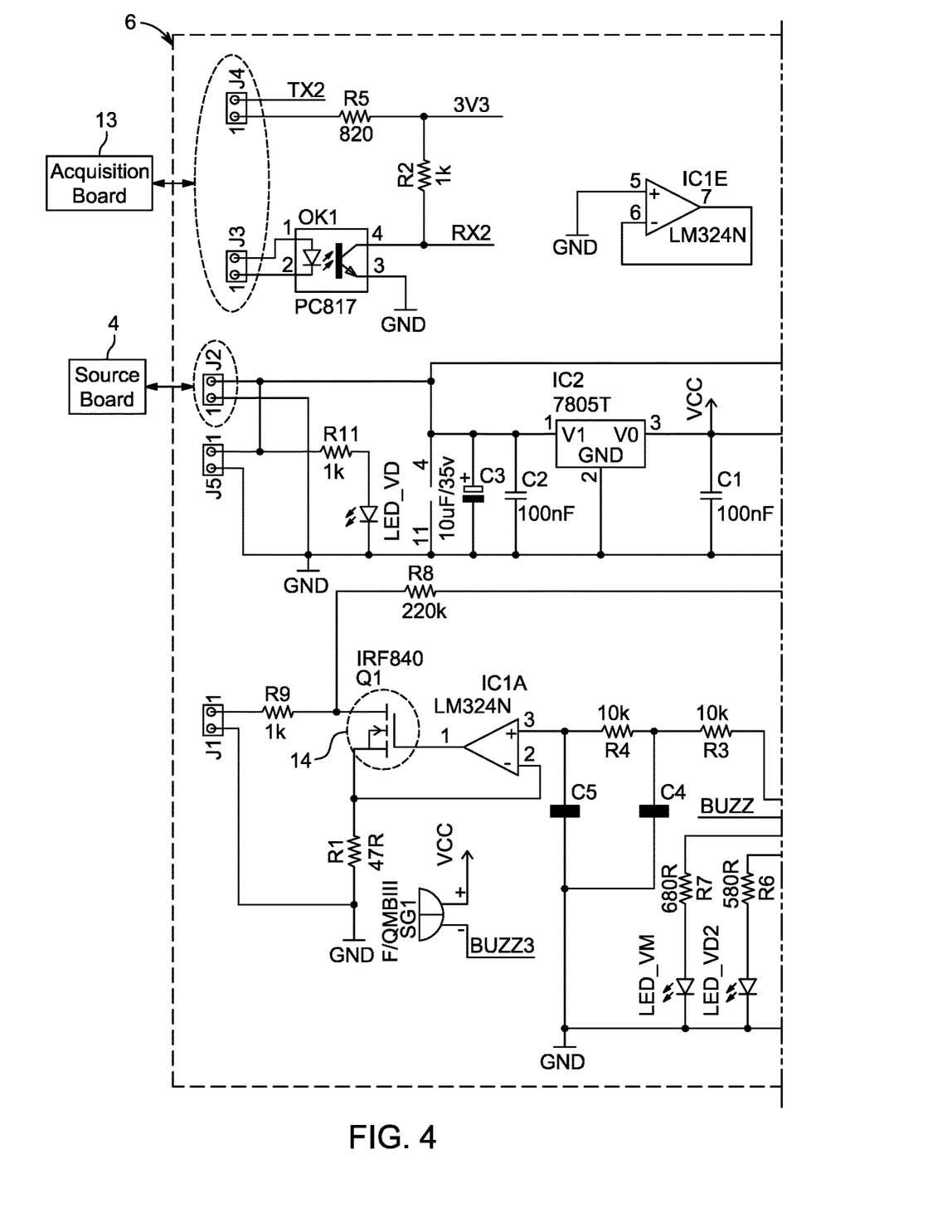
FIG. 4, which illustrates the schematic of the processing board, where there are represented: Power from the source board (4), Microcontroller (5), Communication with the acquisition board (13), MOSFET Transistor (14), Display (15).

The signal processing board, as shown in FIG. 4, has the function of interpreting the signal from the acquisition board and providing the user with the values sent by the bottom sensor. The supply can take place in three ways: through bottomhole sensor emulation, through an electronic load (MOSFET), or through a touchscreen display or resident web page and available via Wi-Fi. These tasks are performed by a microcontroller. The main components of the processing board are: microcontroller (U1 (5)), touchscreen display (DSP1 (15)), and MOSFET transistor (Q1 (14)).

With the regenerator connected and the bottomhole sensor energized, the acquisition of the voltage signal in the resistor (R10 (9)) begins. Initially, there is a wait for the synchronism signal sent by the sensor. From this, the microcontroller (U4 (5)) acts on the gain (12) and offset (11) control, in order to mitigate noise, aiming at avoiding errors in the readings of the data to come. A digital filtering of the signal is performed before sending the same to the processing board.

The communication between the acquisition and processing boards takes place through a serial port using UART protocol, with a rate of 14400 bps. The signal is interpreted by the processing board. The microcontroller (U1 (5)) checks the consistency and acts on the decoding of the received data packets. In case of successful decoding, the microcontroller (5) makes the information available on the display and on the resident web server. If the equipment is in regeneration mode (default), the information is sent to the electronic load (MOSFET transistor (14)) to emulate the bottom sensor. The processing board also has an operating mode that allows the user to create simulated values of variables, a useful action for testing the surface supervisory system. In this case, there is no need for the bottom sensor to be connected.

The electronic system of the present invention allows the reestablishment of SCP measurements that were lost due to leakage currents resulting from damage to electric cables. By retrieving this information, it is possible to operate the well with SCP properly, increasing the productivity. Without the measurements, the SCP well is operated improperly, which can lead to large financial losses.

The invention claimed is:

1. An electronic system for recovering a communication signal of a bottom sensor and testing a communication module (MMI) with the bottom sensor in oil wells operating with submerged centrifugal pumping (SCP), wherein the system comprises 3 electronic boards:
 a power board,
 a signal acquisition board, and
 a signal processing board,
 wherein the signal acquisition board is configured to acquire a signal from the bottom sensor, wherein a voltage variation in a resistor of the signal acquisition board is treated through an active filter and amplifiers with gain adjustment.

2. The system according to claim 1, wherein the power board is configured to power the bottom sensor.

3. The system according to claim 1, wherein the power board supplies a voltage of 60 to 90 VDC, with a maximum current of approximately 67 mA.

4. The system according to claim 1, wherein the power board supplies power to internal circuits of the signal acquisition board or the signal processing board, with voltages of ±10 VDC.

5. The system according to claim 1, wherein the signal acquisition board comprises a microcontroller, an active analog filter, a gain control circuit, an offset, a relay, and a resistor.

6. The system according to claim 1, wherein the signal processing board is configured to interpret a signal coming from the signal acquisition board and providing a user with values sent by the bottom sensor.

7. The system according to claim 6, wherein bottom sensor values are provided by emulation of the bottom sensor, through an electronic load, through a touchscreen display or through a resident web page available via Wi-Fi.

8. The system according to claim 6, wherein the signal processing board comprises a microcontroller, a touchscreen display, and a MOSFET transistor.

9. The system of claim 1, wherein communication between the signal acquisition board and the processing board takes place through a serial port using UART protocol, with a rate of 14400 bps.

10. The system of claim 1, wherein the system has a first operating mode acting as a bottom sensor communication signal regenerator and a second operating mode in the acting as a bottom sensor emulator.

\* \* \* \* \*